United States Patent Office.

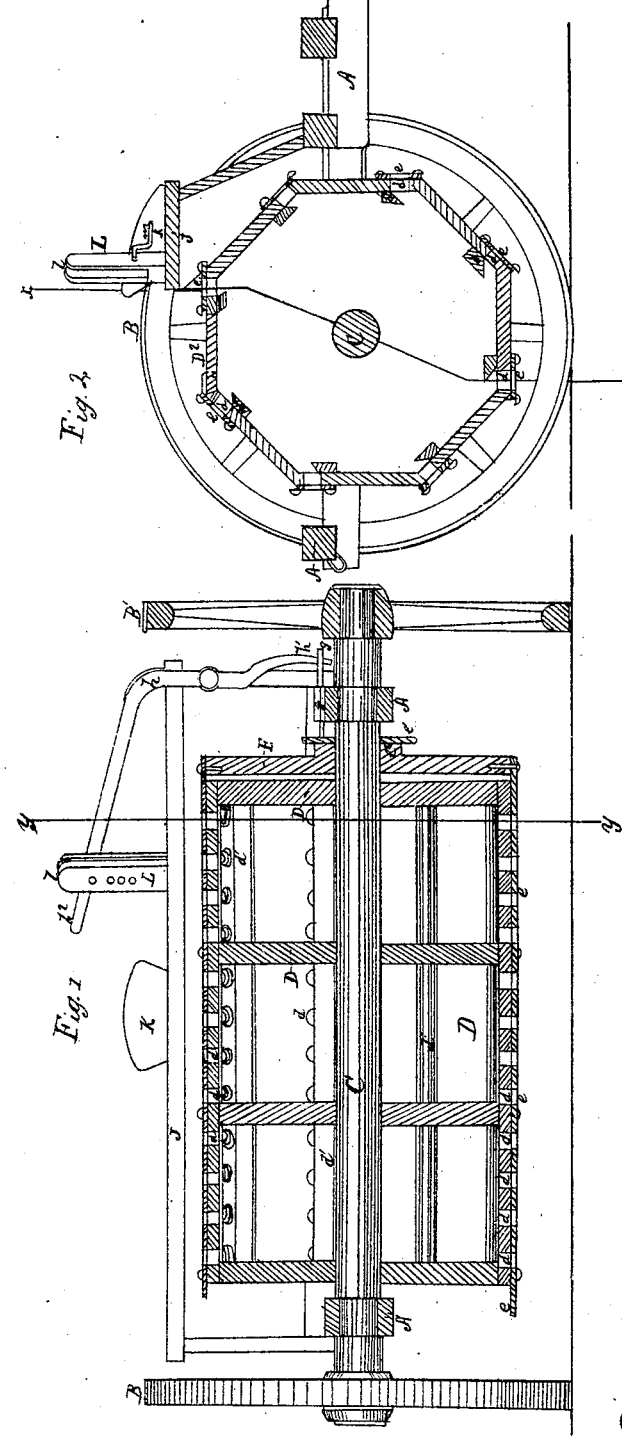

P. A. DOWNER AND A. P. STUART, OF MONMOUTH TOWNSHIP, IOWA.

Letters Patent No. 73,307, dated January 14, 1868.

---

IMPROVEMENT IN SEEDING-MACHINES.

---

The Schedule referred to in these Letters Patent and making part of the same.

---

TO ALL WHOM IT MAY CONCERN:

Be it known that we, P. A. DOWNER and A. P. STUART, of Monmouth township, in the county of Jackson, and State of Iowa, have invented a new and useful Improvement in Seeding-Machines; and we do hereby declare the following to be a full, clear, and exact description of the same, reference being had to the accompanying drawings, which are made part of this specification.

Our invention relates to that class of seeding-machines, in which the seed-reservoir consists of a revolving perforated cylinder, the perforated slides, by which the discharge is regulated, being attached to a sliding head, so that they may all be actuated by a single manipulation; and our improvement consists in a simple arrangement for actuating said sliding head, and also in the provision, at the lower edge of each row of holes, (inside the cylinder,) of bevelled cleats, to prevent any foreign matter, which may be in the grain, from falling upon and stopping the holes. In the drawings—

Figure 1 is a longitudinal section of a seeding-machine, as above described, embodying our improvement, on the line $x$ $x$.

Figure 2 is a transverse section of same on the line $y$ $y$.

A A represent the frame, which may be of any desirable form, and which is supported on wheels B B' on the axle C, one of which, B, is rigidly attached thereto, so as to compel it to rotate with it, and the other, B', runs loosely thereon. so as to facilitate turning. Supported on the axle C, and revolving with it, is a seed-box, D, and an additional head, E, which, in addition to the rotary motion, is capable of being slid on the axle. The seed-box or cylinder D is of an octagonal or other angular form, and is provided with perforations $d$ on each of its sides. These perforations inside of the cylinder are guarded by bevelled cleats $d'$, which prevent any foreign matter, such as straw, sticks, &c., which may be amongst the grain, from falling upon and choking them. The cylinder is also provided with partitions $D^1$, (two or more,) which divide the seed-box into compartments, and prevent the seed being unevenly distributed, all of said compartments being attainable for the supply of seed, through the door $D^2$, which extends the entire length of the cylinder, and is secured by pins and buttons, or any other suitable devices. The head or disk E corresponds in form with the seed-box, and has secured to its periphery, opposite each row of holes in the cylinder, perforated slides $e$, which slide between suitable guides on the sides of each row of holes, the perforations corresponding in size and distance apart with those in the cylinder. The head has also attached to it, near its centre, a disk, $e^1$, which slightly exceeds in diameter the enlargement or bulge $e^2$, to which it is attached. The frame A, on the side adjoining the disk $e^1$, is provided with a bracket, $f$, through which a slide, $g$, passes. This slide has a slot in its end, in which the protruding edge of the disk $e^1$ runs, and a hole in its outer end for the reception of the end $h^1$ of the bent lever $h$, which is pivoted at $i$ to a frame, J, secured to the frame A in front of the revolving cylinder. On top of the frame J, and in reach of the driver's seat K, is a standard, L, in the slot $l$ of which the end $h^2$ of the lever $h$ rests. This standard is provided with a number of holes, $l'$, through either of which, with a corresponding hole in the lever $h$, the pin $m$ may be placed, securing the slide in any desired position, to regulate the flow of seed through the apertures $d$.

Having thus described my invention, what I claim as new, and desire to secure by Letters Patent, is—

1. In a seeding-machine, having a revolving cylinder, the combination of the sliding head E, disk $e^1$, slide $g$, lever $h$, and standard L, all arranged and operating substantially as and for the purpose described.

2. The cleats $d'$, constructed and applied substantially as and for the purpose specified.

To the above specification of our new and useful improvement in seeding-machines, we have signed our hands, this 12th day of June, 1867.

P. A. DOWNER,
A. P. STUART.

Witnesses:
L. W. STUART,
HENRY ZOOK.